(12) United States Patent
Bernard et al.

(10) Patent No.: US 6,799,140 B2
(45) Date of Patent: Sep. 28, 2004

(54) DETECTOR FOR MONITORING ROTATION

(75) Inventors: Jacques Bernard, L'Isle d'Espagnac (FR); Christophe Brault, Touvres (FR)

(73) Assignee: Schneider Electric Industries SA, Rueil-Malmaison (FR)

(*) Notice: Subject to any disclaimer, the term of this patent is extended or adjusted under 35 U.S.C. 154(b) by 214 days.

(21) Appl. No.: 09/793,581

(22) Filed: Feb. 27, 2001

(65) Prior Publication Data

US 2001/0029437 A1 Oct. 11, 2001

(30) Foreign Application Priority Data

Feb. 28, 2000 (FR) .............................. 00 02493

(51) Int. Cl.$^7$ ................................................. G01H 1/10
(52) U.S. Cl. .................... 702/151; 702/43; 702/145; 73/650; 73/514.39; 73/660
(58) Field of Search ................. 702/151, 145, 702/43, 41, 56; 73/650, 514.39, 660, 862.324, 862.325, 862.08; 701/51, 41, 49; 324/161, 167; 369/43, 44.27

(56) References Cited

U.S. PATENT DOCUMENTS

| | | | | |
|---|---|---|---|---|
| 3,888,116 A | * | 6/1975 | Spinella ................. | 73/862.324 |
| 4,169,371 A | * | 10/1979 | Witschi et al. ................. | 73/116 |
| 4,535,288 A | * | 8/1985 | Vitulli, Jr. .................... | 324/161 |
| 4,992,730 A | * | 2/1991 | Hagiya ....................... | 324/160 |
| 5,239,490 A | * | 8/1993 | Masaki et al. ................. | 702/41 |
| 5,297,044 A | * | 3/1994 | Sakaki et al. ................. | 702/43 |
| 5,390,545 A | * | 2/1995 | Doan .......................... | 73/650 |
| 5,757,676 A | * | 5/1998 | Hobelsberger .............. | 702/145 |
| 6,199,018 B1 | * | 3/2001 | Quist et al. .................... | 702/34 |
| 2003/0072226 A1 | * | 4/2003 | Watanabe et al. ........ | 369/44.32 |

FOREIGN PATENT DOCUMENTS

| | | |
|---|---|---|
| EP | 0 368 793 | 5/1990 |
| EP | 0 843 177 | 5/1998 |
| FR | 2 621 119 | 3/1989 |

* cited by examiner

*Primary Examiner*—John Barlow
*Assistant Examiner*—Hien Vo
(74) *Attorney, Agent, or Firm*—Oblon, Spivak, McClelland, Maier & Neustadt, P.C.

(57) ABSTRACT

A detector for monitoring rotation of a target includes a sensor unit, a microcontroller, and an operator conversation apparatus. The operator conversation apparatus is connected to the microcontroller and enables setting of the detector in a working mode or a learning mode.

33 Claims, 2 Drawing Sheets

DETECTOR FOR MONITORING ROTATION

BACKGROUND OF THE INVENTION

The present invention concerns a detector for monitoring rotation including functions for learning the passage frequency to be monitored, for selecting an operating range, and for calculating a triggering frequency. This detector may be used, for example, for monitoring the speed of rotary movement.

DESCRIPTION OF THE BACKGROUND ART

Detectors for monitoring rotation are frequently used in a great number of industries in order to monitor movement, sliding, breakage of a conveyor belt, and the like. Rotation detectors are capable of combining information acquisition functions of a conventional detector by means of a sensor unit and simple processing functions by counting information received by the detector during a given time and by comparing the information received with a triggering frequency preset on the apparatus. A binary signal resulting from this comparison is provided at the output. An economical apparatus is thus obtained, well suited for processing simple subspeed or overspeed problems. However, the operator must adjust the triggering and/or resetting frequency of the device according to the desired application. The adjustment is generally made by using the screw of a potentiometer mounted on the rotation detector. The adjustment is tedious because the operator does not have any feedback information on the adjustment which he has just carried out.

Document FR 2621119 describes a device for signalling the exceeding of a speed limit. This device includes input means actuated by an operator for storing a reference threshold with which a measured speed will be compared. Document EP 0843177 also describes a device for measuring the speed of a locomotion means, where an operator may select one or more reference thresholds. However, in addition to the fact that these devices are only provided for monitoring overspeed and not for monitoring subspeed, they do not allow an operator to be able to select different operating ranges about a same reference value.

SUMMARY OF THE INVENTION

The object of the invention is to provide an operator with a simplification of the adjustment of the detector, and to provide him with greater flexibility in its use by enabling rapid alteration of the accuracy of the device, while maintaining the most economical solution as possible for such a detector.

For this purpose, the invention describes a detector for monitoring rotation, in front of which a target passes. In order to monitor a relative passage frequency, the detector includes a sensor unit sensitive to the passage of the target, connected through a detection stage to the input of a microcontroller that delivers a binary output signal by means of a power stage. The detector includes means for conversing with the operator, connected to the microcontroller in order to set the detector in a working mode or in a learning mode. The learning mode enables the microcontroller to measure the normal passage frequency and to select an operating range for the detector.

The operating range is selected by an operator from a plurality of predefined ranges within the microcontroller through the conversational means. The microcontroller calculates, for the normal calculated passage frequency and from the selected operating range, a triggering frequency different from the normal passage frequency. It also calculates a resetting frequency between the triggering frequency and the normal passage frequency. For use in subspeed monitoring, the triggering frequency is lower than the normal passage frequency. For overspeed monitoring, the triggering frequency is greater than the normal passage frequency.

BRIEF DESCRIPTION OF THE DRAWINGS

Other characteristics and advantages will become apparent in the detailed description which follows with reference to an exemplary embodiment and illustrated by the appended drawings wherein.

DETAILED DESCRIPTION OF THE PREFERRED EMBODIMENTS

Figure 1:
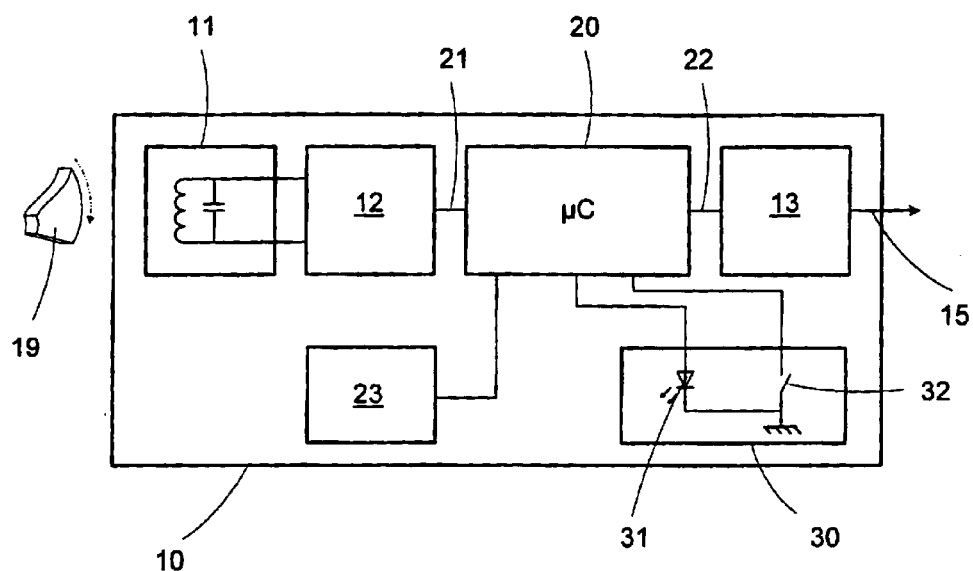
FIG. 1 illustrates the simplified internal architecture of a detector with rotation monitoring according to the invention.

In FIG. 1, a detector 10 monitors the passage frequency of a target 19 to detect a subspeed and/or an overspeed relative to a normal passage frequency. The detector 10 includes the following components:

A sensor unit 11 sensitive to the passage of a target 19 in front of the detector 10, thus forming the information acquisition unit of detector 10. This sensor unit 11 may be a capacitive, magnetic or inductive transducer as shown in FIG. 1. The sensor unit n may also be the receiving unit of a photoelectric or other detector;

A detection stage 12 connected to sensor unit 11, responsible for amplifying and shaping the signal emitted by the sensor unit towards:

A microcontroller 20 having an input 21 connected to the output of the detection stage 12 and providing a binary output signal 22;

A power stage 13 that receives as an input the binary output 22 of the microcontroller, in order to provide the binary output 15 of detector 10. This binary output 15 may be either in the 0 state or in the 1 state;

Storage means 23, for example EEPROM or FLASH memory, connected or integrated to the microcontroller 20, Operator conversational means 30 connected to the microcontroller 20.

According to a preferred embodiment, the conversational means 30 includes a light emitting diode 31 driven by microcontroller 20 and push-button 32 in order to retain an economical solution for detector 10.

Moreover, to minimize the consumption of electricity by the detector 10, it is preferable to have microcontroller 20 operate with a very low clock frequency, for example of the order of 32 kHz and a low supply voltage, for example of the order of 3 volts.

Detector 10 has two operating modes: a working mode and a learning mode. The working mode corresponds to the usual operation of detector 10 for monitoring the passage of a target 19 in front of it and for providing a binary signal 15 based on the frequency of passage of this target 19. The learning mode enables the configuration of detector 10, i.e. it enables the microcontroller 20 to measure a normal passage frequency N, to calculate a triggering frequency D, and a resetting frequency R from the measured normal passage frequency N and from a selected operating range.

When the learning mode is enabled, the operator is informed by the light emitting diode 31, and the detector 10 measures the normal passage frequency N corresponding to the frequency at which the target 19 should pass in front of the detector 10 during normal operation of the facility. The facility should operate at a normal rate so that the detector may measure this frequency N. Once the microcontroller 20 has acquired the normal passage frequency N, it reports this to the operator by the light emitting diode 31. Thus, no direct adjustment on the detector 10 is required from the operator: he simply has only to put the facility into normal operation so that detector 10 measures the normal passage frequency N.

In the learning mode, the operator may then select an operating range M. The operating range is selected from a plurality of predefined ranges in the memory of microcontroller 20, different from the normal passage frequency N and corresponding to different ranges of use of the detector about a same normal passage frequency N, thus providing great flexibility in the accuracy of the detector 10. According to a preferred embodiment, the operating range is expressed as a percentage of the normal passage frequency N and four predefined ranges may be devised with values equal, for example, to 5%, 10%, 20%, or 30% of the normal passage frequency N. The operator may view the various predefined ranges by scrolling, whereby each range may be displayed by a different blinking of the light emitting diode 31. The operator validates the operating range M which he has selected by extended action on the push-button 32.

According to an equivalent alternate embodiment, the learning mode may be enabled by the operator by pressing on the push-button 32 for a long time (typically for more than 5 seconds). When the microcontroller 20 has acquired the normal passage frequency N, it reports to the operator by the light emitting diode 31. By default, the microcontroller 20 determines the predefined largest operating range M (30% in the example) which corresponds to the least constraining use of detector 10, which has the advantage of facilitating the starting of certain applications. The operator successively presses on the push-button 32 (typically for more than two seconds in order to avoid any untimely maneuver) to select a more accurate operating range M. For example, by pressing on the button a first time, the predefined range 20% will be selected and will cause one blink of the light emitting diode 31. By pressing a second time, the predefined range 10% will be selected and will cause two blinks. Finally, by pressing a third time, the predefined range 5% will be selected and will cause three blinks. When the most accurate predefined operating range frI is selected (i.e. 5% in the above-mentioned example), further pressing on the push-button 32 will not cause a response, unless the push-button 32 is depressed for a long time. Depressing push-button 32 for a long time restarts acquisition of a fresh normal passage frequency N.

As soon as the operating range M is selected, the microcontroller calculates a triggering frequency D, based on the operating range M and on the normal passage frequency N. If the detector 10 is used as a subspeed detector, then the triggering frequency D is lower than the normal passage frequency N and is equal to the normal passage frequency N minus the selected operating range M (see the calculation examples hereafter). If the detector 10 is used as an overspeed detector, then the triggering frequency D is larger than the normal passage frequency N and is equal to the normal passage frequency N increased by the operating range M.

Microcontroller 20 then calculates a resetting frequency R lying between the triggering frequency D and the normal passage frequency N. According to a preferred embodiment, the resetting frequency R lies half-way between the triggering frequency D and the normal passage frequency N. The storage means 23 are used by the microcontroller 20 for notably storing the selected operating range M, the triggering frequency D and the resetting frequency R.

It is not necessary for the operator to select an operating range M, because the microcontroller 20 always has a default value. This default value may either be the largest of the predefined ranges in the microcontroller if this is the first use of detector 10, or the last selected operating range during a previous learning phase of detector 10 and stored in the storage means 23.

When the normal passage frequency N is measured and the microcontroller 20 has stored the selected operating range M, the triggering frequency D and the resetting frequency R, then the detector 10 resumes the working mode.

Figure 2:
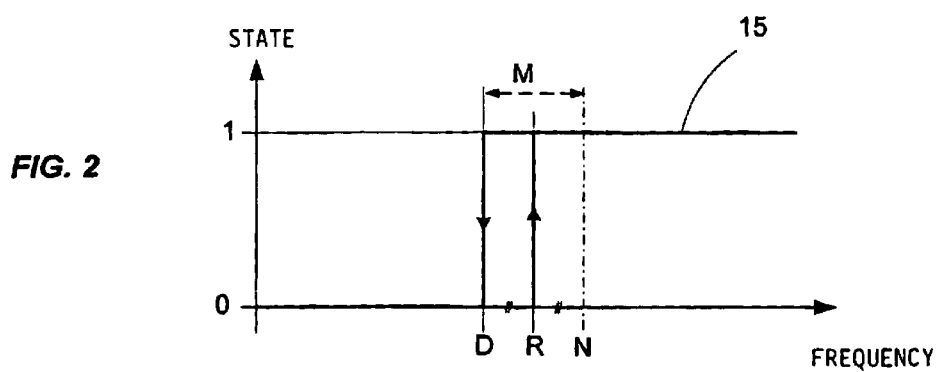
FIG. 2 is an illustration of the response curve of a detector used in subspeed monitoring.

In the working mode, if detector 10 is used as an subspeed detector as shown in FIG. 2, binary output 15 is switched to a first state (0 or 1, respectively) when the passage frequency for target 19 is lower than the triggering frequency D. Binary output 15 is switched to the second state (1 or 0, respectively) when this passage frequency is greater than the resetting frequency R. If, for example, the operator has selected an operating range M equal to 10%, the detector 10 will switch its binary output 15 to the first state when the passage frequency for target 19 is less than the triggering frequency $D_1 = N - 10\% * N$, i.e.: $0.9*N$, and the detector 10 will switch its binary output 15 to the second state when the passage frequency for the target 19 is greater than the resetting frequency $R_1 = N - (10/2)\% * N$, i.e.: $0.95*N$.

Figure 3:
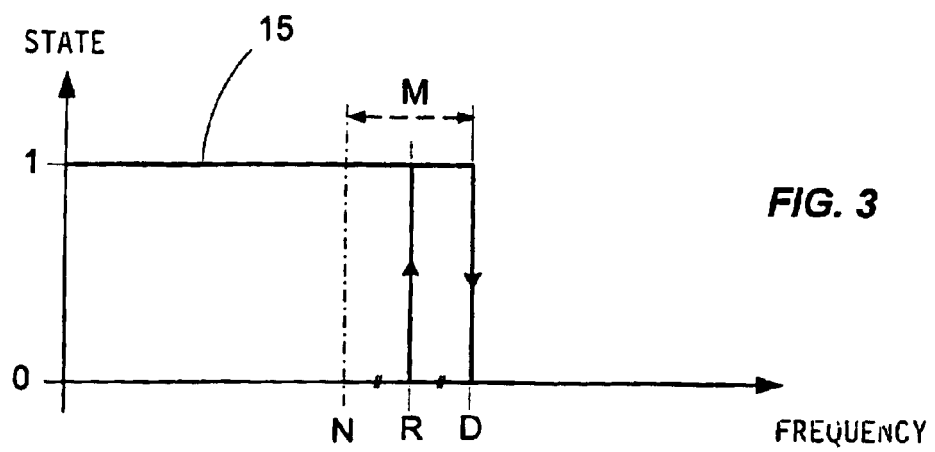
FIG. 3 illustrates the response curve of such a detector used in overspeed monitoring.

If detector 10 is used as an overspeed detector as shown in FIG. 3, binary output 15 is switched to a first state (0 or 1, respectively) when the passage frequency for target 19 is greater than the triggering frequency D. Binary output 15 is switched to the second state (1 or 0, respectively) when this passage frequency is lower than the resetting frequency R. If, for example, the operator has selected an operating range M equal to 10%, the detector 10 will switch its binary output 15 to the first state when the passage frequency for target 19 in front of detector 10 is larger than the triggering frequency $D_2 = N + 10\% * N$, i.e.: $1.1*N$, and detector 10 will switch its binary output 15 to the second state when the passage frequency for the target 19 is less than the resettin fre uenc $R_2 = N + (10/2)\% * N$, i.e.: $1.05*N$.

Figure 4:
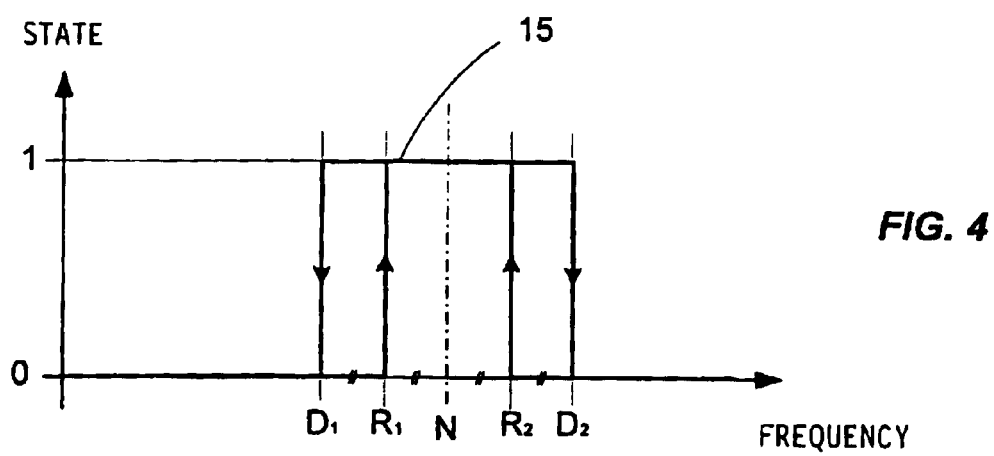
FIG. 4 illustrates the response curve of such a detector used in both subspeed and overspeed monitoring, simultaneously.

It is possible to contemplate a detector 10 which simultaneously operates both as an subspeed detector and an overspeed detector, as shown in FIG. 4. In this case, from the selected operating range M, the microcontroller 20 uses both triggering frequencies $D_1$ and $D_2$, symmetric with respect to the normal frequency N, wherein $D_2$ is larger than $D_1$. Detector 10 switches its binary output 15 to a first state (0 or 1, respectively) when the passage frequency of target 19 is greater than the triggering frequency $D_2$ or is less than the triggering frequency $D_1$. Detector 10 switches its binary output 15 to the second state (1 or 0, respectively) when the passage frequency of target 19 is less than the resetting frequency $R_2$ and greater than the resetting frequency $R_1$.

Of course, it is possible to devise other detailed alternatives and enhancements and even to contemplate the use of equivalent means without departing from the scope of the invention.

What is claimed is:

1. A detector for monitoring rotation of a target, comprising:
   a sensor unit;
   a microcontroller; and
   operator conversation means, wherein
   the operator conversation means is connected to the microcontroller and enables setting of the detector in a working mode or a learning mode, and the learning mode enables setting of a triggering frequency, and
   the learning mode enables the microcontroller to measure a normal passage frequency and to select an operating range for the detector.

2. The detector according to claim 1, wherein the sensor is connected to the microcontroller through a detection stage.

3. The detector according to claim 1, wherein an output of the detector is in binary (0 or 1) form.

4. The detector according to claim 1, wherein the operating range is selected from a plurality of predefined ranges in the microcontroller.

5. The detector according to claim 1, wherein the operating range is selected using the conversation means.

6. The detector according to claim 4, wherein the microcontroller calculates a triggering frequency different from the normal passage frequency.

7. The detector according to claim 4, wherein the microcontroller calculates a triggering frequency from the normal passage frequency and the selected operating range.

8. The detector according to claim 6, wherein the microcontroller calculates a resetting frequency between the triggering frequency and the normal passage frequency.

9. The detector according to claim 8, wherein the resetting frequency is halfway between the triggering frequency and the normal passage frequency.

10. The detector according to claim 8, wherein the triggering frequency is less than the normal passage frequency.

11. The detector according to claim 10, wherein the detector monitors a passage of a target while in the working mode, and switches a binary output to a first state (0 or 1) when the normal passage frequency for the target is less than the triggering frequency.

12. The detector according to claim 11, wherein the detector monitors the passage of the target while in the working mode, and switches the binary output to a second state (1 or 0) when the normal passage frequency for the target is greater than the resetting frequency.

13. The detector according to claim 6, wherein the triggering frequency is greater than the normal passage frequency.

14. The detector according to claim 13, wherein the detector monitors a passage of a target while in the working mode, and switches a binary output to a first state (0 or 1) when the normal passage frequency for the target is greater than the triggering frequency.

15. The detector according to claim 14, wherein the detector monitors the passage of the target while in the working mode, and switches the binary output to a second state (1 or 0) when the normal passage frequency for the target is less than the resetting frequency.

16. The detector according to claim 1, further comprising: a storage means.

17. The detector according to claim 16, wherein the storage means is configured to store a selected operating range, said triggering frequency, and a resetting frequency.

18. The detector according to claim 1, wherein the conversation means comprises:
   a push-button; and
   a light emitting diode.

19. A detector for monitoring rotation of a target, comprising:
   a sensor unit;
   a microcontroller; and
   operator conversation means, wherein
   the operator conversation means is connected to the microcontroller and enables setting of the detector in a working mode or a learning mode, and the learning mode enables the microcontroller to measure a normal passage frequency and to select an operating range for the detector.

20. The detector according to claim 19, wherein the operating range is selected from a plurality of predefined ranges in the microcontroller.

21. The detector according to claim 19, wherein the operating range is selected using the conversation means.

22. The detector according to claim 20, wherein the microcontroller calculates a triggering frequency different from the normal passage frequency.

23. The detector according to claim 20, wherein the microcontroller calculates a triggering frequency from the normal passage frequency and the selected operating range.

24. The detector according to claim 22, wherein the microcontroller calculates a resetting frequency between the triggering frequency and the normal passage frequency.

25. The detector according to claim 24, wherein the resetting frequency is halfway between the triggering frequency and the normal passage frequency.

26. The detector according to claim 24, wherein the triggering frequency is less than the normal passage frequency.

27. The detector according to claim 26, wherein the detector monitors a passage of a target while in the working mode, and switches a binary output to a first state (0 or 1) when the normal passage frequency for the target is less than the triggering frequency.

28. The detector according to claim 27, wherein the detector monitors the passage of the target while in the working mode, and switches the binary output to a second state (1 or 0) when the normal passage frequency for the target is greater than the resetting frequency.

29. The detector according to claim 22, wherein the triggering frequency is greater than the normal passage frequency.

30. The detector according to claim 29, wherein the detector monitors a passage of a target while in the working mode, and switches a binary output to a first state (0 or 1) when the normal passage frequency for the target is greater than the triggering frequency.

31. The detector according to claim 30, wherein the detector monitors the passage of the target while in the working mode, and switches the binary output to a second state (1 or 0) when the normal passage frequency for the target is less than the resetting frequency.

32. The detector according to claim 19, further comprising:
   a storage device configured to store said selected operating range, a triggering frequency, and a resetting frequency.

33. The detector according to claim 19, wherein the conversation means comprises:
   a push-button; and
   a light emitting diode.

* * * * *